(12) United States Patent
Loychik et al.

(10) Patent No.: US 11,089,458 B2
(45) Date of Patent: *Aug. 10, 2021

(54) SMART COMMUNICATION DEVICE OR APPARATUS FOR COLLECTING AND EVALUATING INFORMATION ABOUT EQUIPMENT DISTRIBUTED OVER A LARGE AREA, E.G., OVER A LARGE INDUSTRIAL PLANT OR OIL FIELD

(71) Applicant: ITT MANUFACTURING ENTERPRISES LLC, Wilmington, DE (US)

(72) Inventors: Neil Loychik, Victor, NY (US); James Reitano, Churchville, NY (US); Naveen George, Rochester, NY (US); Bradley C. Decook, Victor, NY (US); Jeffrey Sullivan, Syracuse, NY (US); Daniel L. Kernan, Liverpool, NY (US); Ken Hauenstein, Seneca Falls, NY (US); David Rayle, Elbridge, NY (US)

(73) Assignee: ITT MANUFACTURING ENTERPRISES LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,679

(22) Filed: May 24, 2019

(65) Prior Publication Data

US 2019/0281431 A1 Sep. 12, 2019

Related U.S. Application Data

(63) Continuation of application No. 14/933,230, filed on Nov. 5, 2015, now Pat. No. 10,306,435.

(51) Int. Cl.
*H04W 4/70* (2018.01)
*H04W 64/00* (2009.01)
(Continued)

(52) U.S. Cl.
CPC ............ *H04W 4/70* (2018.02); *G06Q 10/087* (2013.01); *G07C 1/10* (2013.01); *G07C 3/00* (2013.01);
(Continued)

(58) Field of Classification Search
CPC ....... H04W 4/005; H04W 4/70; H04W 4/024; H04W 4/02; H04W 4/023; H04W 40/20;
(Continued)

(56) References Cited

U.S. PATENT DOCUMENTS

2005/0023347 A1* 2/2005 Wetzel ..................... G07C 1/20
235/385
2006/0258289 A1* 11/2006 Dua ........................ G06F 16/44
455/41.3

(Continued)

FOREIGN PATENT DOCUMENTS

EP 1081659 A1 3/2001

OTHER PUBLICATIONS https://www.fitbit.com, Oct. 1, 2015, 3 pages.

*Primary Examiner* — Christopher R Crompton
(74) *Attorney, Agent, or Firm* — Carter, DeLuca & Farrell LLP; George Likourezos; Bret P. Shapiro (57) ABSTRACT

Apparatus is provided having a smart communication device having a processor configured to: receive signaling containing information about sensed data from a multiplicity of data collectors each associated with a respective piece of equipment and configured to collect the sensed data related to the respective piece of equipment when the smart communication device is moved within a predefined proximity to
(Continued)

The Basic Apparatus and Associated Signal Processor Functionality automatically connect with each data collector to receive the signaling during movement of the smart communication device on a programmed route having multiple pieces of equipment; and determine corresponding signaling containing information about prioritized sensed data related to each of the multiplicity of data collectors for operating an app in the processor, based upon the signaling received. The smart communication device includes an iPad, a smart phone, a laptop or a subsystem of a vehicle/robot. The apparatus may include the vehicle/robot having the subsystem.

20 Claims, 5 Drawing Sheets (51) Int. Cl.
| | | |
|---|---|---|
| *H04W 40/20* | (2009.01) | |
| *H04L 12/24* | (2006.01) | |
| *H04W 4/024* | (2018.01) | |
| *G07C 1/10* | (2006.01) | |
| *G07C 3/00* | (2006.01) | |
| *G06Q 10/08* | (2012.01) | |
| *H04W 4/02* | (2018.01) | |

(52) U.S. Cl.
CPC ........... *H04L 41/0886* (2013.01); *H04W 4/02* (2013.01); *H04W 4/023* (2013.01); *H04W 4/024* (2018.02); *H04W 40/20* (2013.01); *H04W 64/006* (2013.01)

(58) Field of Classification Search
CPC ..... H04W 64/006; G06Q 10/087; G07C 1/10; G07C 3/00; H04L 41/0886
USPC ......................................................... 370/254
See application file for complete search history.

(56) References Cited

U.S. PATENT DOCUMENTS

| | | | |
|---|---|---|---|
| 2007/0112461 A1* | 5/2007 | Zini | G05D 1/0274 700/245 |
| 2014/0247116 A1 | 9/2014 | Davidson | |
| 2014/0344118 A1* | 11/2014 | Parpia | G06Q 10/087 705/28 |
| 2015/0287318 A1* | 10/2015 | Nair | G05B 19/418 340/5.52 |
| 2017/0013064 A1* | 1/2017 | Knight | H04L 67/14 |
| 2017/0034154 A1* | 2/2017 | Abbondanzio | H04W 12/06 |

* cited by examiner

Figure 1

Figure 3A: The Basic Route Check Functionality

Apparatus 10, e.g., including a smart communication device,

Processor or processing module 10a configured at least to:

receive signaling containing information about sensed data from a multiplicity of data collectors each associated with a respective piece of equipment and configured to collect the sensed data related to the respective piece of equipment when the smart communication device is moved within a predefined proximity to automatically connect with each data collector to receive the signaling during movement of the smart communication device on a programmed route having multiple pieces of equipment;

determine corresponding signaling containing information about sensed data related to each of the multiplicity of data collectors on the programmed route for operating an app on the processor, based upon the signaling received; and/or provide the corresponding signaling containing information about the sensed data related to each of the multiplicity of data collectors, including for displaying screens that form part of the app.

Other signal processor circuits or components 10b that do not form part of the underlying invention, e.g., including input/output modules, one or more memory modules, data, address and control busing architecture, etc.

Data collectors D

Pieces of equipment E (e.g., pumps) on a programmed route in an app

Figure 2: The Basic Apparatus and Associated Signal Processor Functionality

Figure 3B: Access Screen

Figure 3C: Route Screen

Figure 3D: Add New Route Screen

Figure 3E: Route Options/Settings Screen

Figure 3F: Walk-Around Screen

Figure 3G: Report Page Screen

SMART COMMUNICATION DEVICE OR APPARATUS FOR COLLECTING AND EVALUATING INFORMATION ABOUT EQUIPMENT DISTRIBUTED OVER A LARGE AREA, E.G., OVER A LARGE INDUSTRIAL PLANT OR OIL FIELD

CROSS-REFERENCE TO RELATED APPLICATIONS

This Application is a continuation under 35 U.S.C. § 120 of U.S. application Ser. No. 14/933,230 filed on Nov. 5, 2015. The disclosure of this application is hereby incorporated herein by reference in its entirety.

BACKGROUND OF THE INVENTION

1. Field of the Invention

This application relates to a technique for collecting and evaluating information about equipment distributed over a large area, e.g., over a large industrial plant or oil field; and more particularly relates to a technique for further processing such collected and evaluated information using a processor or processing module to determine the health/operability of the equipment.

2. Brief Description of Related Art

Figure 1:
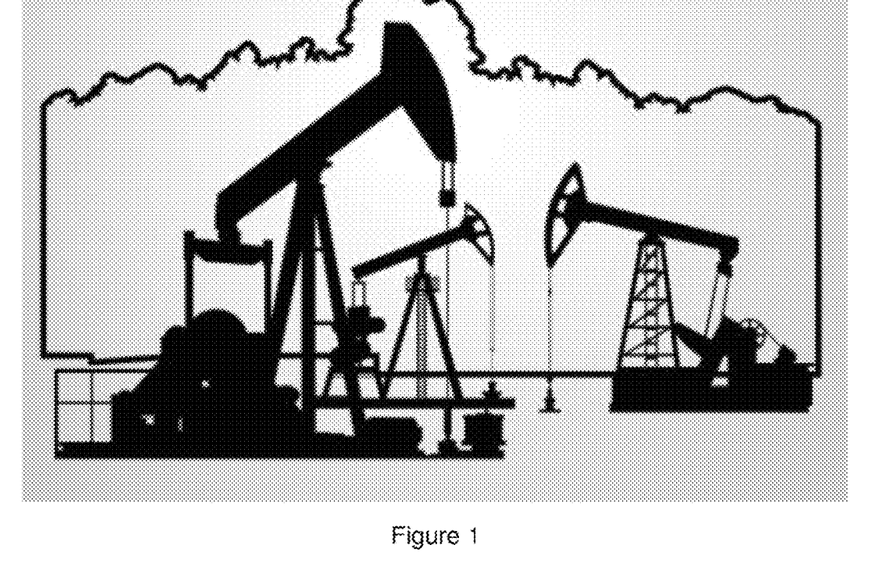
FIG. 1 shows an oil field having industrial oil rigs distributed over a vast oil field landscape.

By way of example, FIG. 1 shows an oil field having industrial oil rigs/equipment distributed over a vast oil field landscape that each may include one or more condition monitoring devices to monitor parameters related to a respective industrial oil rig. Other known facilities may have equipment distributed in hazardous locations that each may include one or more such condition monitoring devices and do not have WIFI access throughout the facility. In these types of distributed industrial equipment arrangements, evaluation of equipment health data generally can be difficult, and in some cases may require a so-called 'walk around' to collect data and inspect the equipment. In such cases, collection can be time consuming, and require close proximity for low signal strength radio communications or a physical connection to a data collector associated with the equipment.

Data collection and evaluation technology are known in non-industrial applications for health monitoring—like the fitbit or internet networking, but such technology has not been applied to distributed industrial equipment arrangements.

One problem in the industry is that there is no known technique that allows for easily collecting and evaluating such equipment health data, e.g., in such distributed industrial equipment arrangements over vast locations with limited internet connectivity, e.g., like a large industrial plant or an oil field. In view of this, there is a need in the industry for such a collecting and evaluating technique.

SUMMARY OF THE INVENTION

The present invention provides a new and unique way to automate the process for collecting and evaluating such equipment health data. The present invention may takes the form of (1) a smart device utility, e.g., including a process of connection and extracting relevant data; (2) a smart device app design, e.g., including a human facing interface for providing an interactive look and feel; and (3) a robotic walk around device, e.g., including where no human interaction is required to automatically connect, collect and evaluate such equipment health data.

Moreover, the present invention provides a smart walk-around utility device or tool for walk-around scanning that includes the integration of walk around activity with a smart communication device; and automatically manage connection activity based upon relevant data collection parameters. By way of example, embodiment are envisioned in the fields of equipment monitoring in relation to pumps, planes, trains, windmills, etc.

Moreover still, the present invention provides a walk around functionality for implementing in a mobile application, e.g., on a smart communication device or an Alert walk-around tool specifically tailor for this application; and mobile application screens and associated mobile application functionality for implementing the walk around that may be a component of an app, or may be a completely separate app.

Definitions

For the purpose of the discussion herein, the following terms are defined and summarized, as follows:

Walk Around—A process of moving from equipment-to-equipment for physical inspection of machinery and collection of data that can indicate the current and future health of each machine/equipment.

Participant—A human, or human controlled vehicle (drone, car), or a robot (autonomous) which has access to a smart communication device. The participant's role is to collect data and take action on the equipment if action is required.

Smart Communication Device—Phones, laptops, or sub-systems of vehicles/robots, etc. Defined by the ability to perform generic processing and ability to convert data into a meaningful format for a Participant.

Trend—Historical data comprised of equipment status, raw data or analytics stored on a data collector and able to be accessed by a participant.

Analytics—Processed sensor data that reduces raw signal information into relevant features. E.g. RMS, FFT, Status.

Surface Data—Data that is easily accessible from a data collector (e.g. advertised) and does not require a paired connection to access. Surface data can include raw or analyzed sensor data, equipment status, manufacturing information, software/firmware versions, etc. Anything that helps determine relevance/priority of a connection.

Summary of Basic Functionality

According to the present invention, the technique according to the present invention may include, or take the form of, some combination of the following features:

By way of example, a server or a user may identify relevant data for collection from a walk around of the equipment on a specific route. For example, the relevant data may include search parameters of a data collector to 'look' for in a future data acquisition (e.g., updates for future relevant data); data to collect from historical data on a data collector (e.g., a previous set of relevant data), including surface data (e.g., so-called Alert terminology=advertising packet) or historical data (e.g., so-called Alert terminology=trend, regularly scheduled FFT's); or a participant/user's request for immediate processing of associated data when reaching a proximity to the data acquisition device (i.e., immediate data evaluation to determine if the participant's interaction with the machine is necessary). For example, upon reaching some proximity, a participant determines if the equipment is running, and if running, perform an FFT (if equipment is running), and send the FFT into a diagnostic algorithm for evaluation. Alternatively, for example, upon reaching some proximity, a participant captures surface date and if the device/equipment is in alarm condition, then the participant connects for historical (trend) data.

By way of example, a participant carrying the smart communication device may arrive in proximity to a data collector associated with a piece of equipment. The smart communication device and data acquisition device may automatically communicate to identify, e.g., relevant data to upload to the participant's device from the data acquisition device, data requests from the Smart Communication Device may be sent (e.g., Raw data and analysis), and/or update the data acquisition device on the equipment to look for relevant data in relation to the piece of equipment. In addition, the smart communication device may be configured to manage a walk around completion in order to Identify data acquisition devices on pieces of equipment in need of pairing, and/or identify data acquisition devices that may have been 'skipped' from a region of a walk around.

By way of example, the smart communication device may manage the download and upload process based upon priority, e.g., including where the participant may only be 'passing through' with limited connectivity so limited data would be transmitted; data collection would also be prioritized based upon the information that the participant or server wishes to collect in priority to other datasets; and/or completion of communication may be tracked and statused for the participant (for instance, so that the participant knows whether to continue with walk around or not).

By way of example, the smart communication device may be configured to manage the participant's experience, e.g., based upon limited bandwidth that may exist between the smart communication device and data acquisition device(s) or the participant's ability to respond to data based upon feedback from a machine/equipment. In the case of limited bandwidth, the smart communication device may to configured to implement a smart device priorities download, such that the most relevant data arrives to the participant the fastest; organize downloads from different equipment; organize the priority of information from each device; and/or optimize the download for the greatest data in the least amount of time. In the case of the participant's ability to respond to data based upon feedback from the machine/equipment, the smart communication device may be configured to identify issues that requires further data, inspection, or actions, and/or take action in any combination between the smart communication device, the participant, and the server.

SPECIFIC EMBODIMENTS

According to some embodiments, the present invention may take the form of apparatus, e.g., including a smart communication device, having a processor configured to:
receive signaling containing information about sensed data from a multiplicity of data collectors each associated with a respective piece of equipment and configured to collect the sensed data related to the respective piece of equipment when the smart communication device is moved within a predefined proximity to automatically connect with each data collector to receive the signaling during movement of the smart communication device on a programmed route having multiple pieces of equipment; and
determine corresponding signaling containing information about sensed data related to each of the multiplicity of data collectors for operating an app in the processor, based upon the signaling received.

The present invention may also include one or more of the following features:

The smart communication device may include, or take the form of, an iPad, a smart phone, a laptop, a subsystem of a vehicle/robot, a tablet, as well as any smart communication device that is now known or later developed in the future.

The apparatus may include, or takes the form of, a robotic device configured to move from equipment-to-equipment on the programmed route to gather the sensed data, including where the robotic device is a human-controlled robot or drone.

The processor may be configured to automatically pair with each data collector to receive the signaling during the movement of the smart communication device (aka a "walk around") on the programmed route, including by implementing a short distance wireless communication protocol.

The sensed data may include some combination of surface data in the form of advertised packets, historical data in the form of trend, or regularly scheduled Fast Fourier Transforms (FFTs), or immediate data needs of a participant.

The processor may be configured to determine if the respective piece of equipment is running, and if so, then perform analytics such as RMS or an FFT to be used in a diagnostic evaluation.

The processor may be configured to capture surface data, and if the respective piece of equipment is in an alarm state, then connect for historical (trend) data or immediate analytics.

The processor may be configured to communicate with a respective data collector associated with a respective piece of equipment to identify relevant data to upload to the smart communication device, provide data requests and update the respective data collector associated with the respective piece of equipment for relevant data for which to look.

The processor is configured to provide associated signaling to communicate with a respective data collector associated with a respective piece of equipment to identify any respective data collector associated with any respective piece of equipment in need of pairing or that may have been skipped from a region of the walk around on the programmed route.

The processor may be configured to provide associated signaling to a data collector in order to prioritize download functionality so that the most relevant data arrives at the smart communication device the fastest, organizes download functionality from different equipment, organizes the priority of information from each data collector, and optimizes download functionality for receiving the most data in the least amount of time.

The processor may be configured to perform signaling processing functionality associated with the signaling received and determined for displaying information on the screen as part of the app for running or operating on the smart communication device.

The app may include route check functionality, including providing a list of all programmed routes available, a summary of information about the programmed routes, or an editing of a pre-existing programmed route. The summary of information about the programmed routes may include an indication of a completion percentage (%), alarm information during a particular route, the ability to add or program a new route, or the ability to search for a specific programmed route or piece of equipment.

The app may include displaying an add new route screen for allowing a user to add a new route having new pieces of equipment, including providing one or more prompts requesting a new route name and a desired order of equipment on the new route.

The app may include displaying a route options screen for allowing a user to provide a report related to one or more programmed routes, a period for checking the one or more programmed routes, and a check due notification warning related to one or more programmed routes.

The app may include displaying a route check screen for allowing a user to check a specific route, including providing information about devices in an alarm condition on the specific route and about alert devices on the specific route.

The app may include displaying a route report screen for allowing a user to generate a route report for a specific route, including providing information about devices in an alarm condition on the specific route and about alert devices on the specific route.

The processor may also be configured to provide the corresponding signaling containing information about the prioritized sensed data related to each of the multiplicity of data collectors, consistent with that set forth herein.

The processor may also be configured to provide associated signaling to one or more of the multiplicity of data collectors, e.g., containing information about how to adapt respective prioritized sensed data related to each of the one or more of the multiplicity of data collectors that will be provided to the smart communication device, consistent with that set forth herein.

The smart communication device may include a memory for storing one or more databases, and the processor configured to store the programmed route in the database of the memory.

The present invention may also take the form of a method for running an app on a smart communication device having a processor and a memory for storing a database, comprising steps for receiving in the processor signaling containing information about sensed data from a multiplicity of data collectors each associated with a respective piece of equipment stored in a programmed route in the database of the memory and configured to collect the sensed data related to the respective piece of equipment when the smart communication device is moved within a predefined proximity to automatically connect or pair with each data collector to receive the signaling during movement of the smart communication device on the programmed route having multiple pieces of equipment distributed over a vast industrial, commercial or residential space; and determining with the processor corresponding signaling containing information about the sensed data related to each of the multiplicity of data collectors on the programmed route, based upon the signaling received. The method may also include one or more of the features set forth herein.

BRIEF DESCRIPTION OF THE DRAWING

The drawing includes the following Figures.

DETAILED DESCRIPTION OF THE INVENTION

Figure 2:
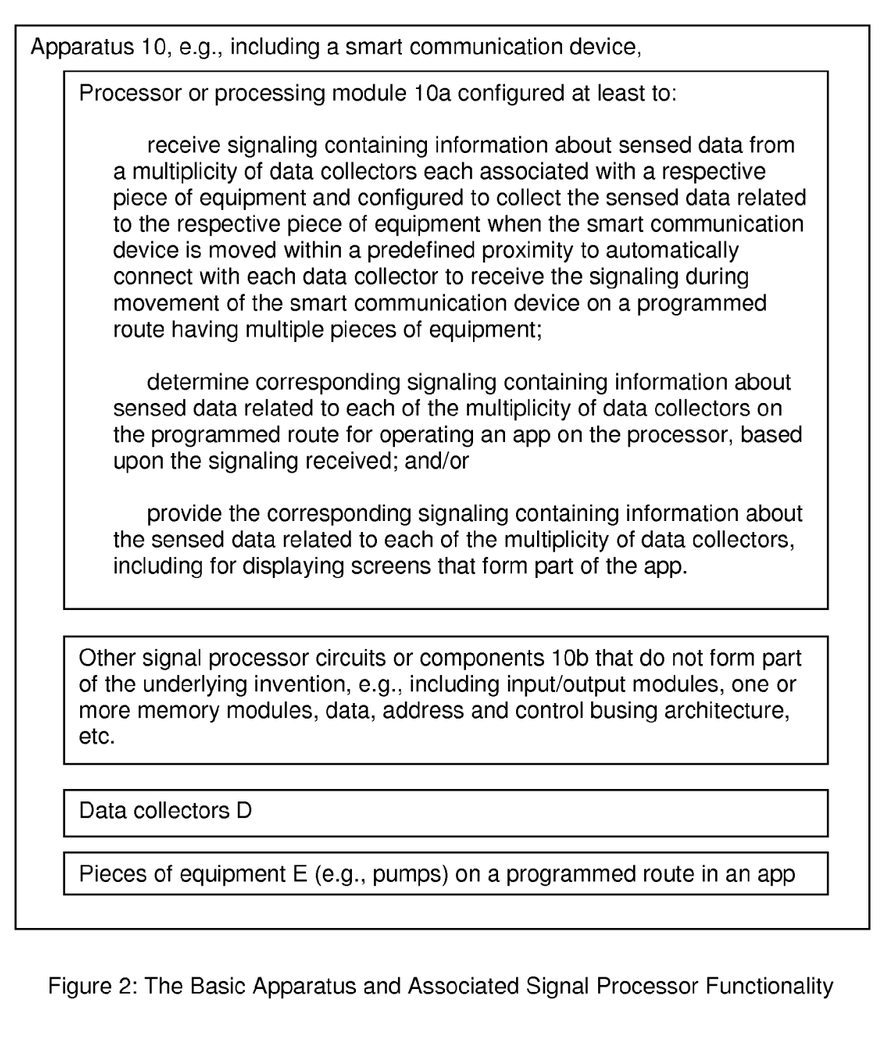
FIG. 2 is a block diagram of apparatus that includes a smart communication device having a memory and a database and a processor for implementing the signal processing functionality according to the present invention.

FIG. 2 shows apparatus generally indicated as 10, e.g., including a smart communication device, having a processor 10*a* configured to:
receive signaling containing information about sensed data from a multiplicity of data collectors D each associated with a respective piece of equipment E and configured to collect the sensed data related to the respective piece of equipment E when the smart communication device 10 is moved within a predefined proximity to automatically connect or pair with each data collector D to receive the signaling during movement of the smart communication device on a programmed route having multiple pieces of equipment E; and
determine corresponding signaling containing information about sensed data related to each of the multiplicity of data collectors D for operating an app on the processor 10*a*, based upon the signaling received.

The data collector D may include, or take the form of, the alarm device set forth below. The scope of the invention is not intended to be limited to any particular type or kind of data collector D either now known or later developed in the future.

The equipment E may include, or take the form of, pumps, planes, trains, windmills, etc., consistent with that set forth herein. The scope of the invention is not intended to be limited to any particular type or kind of equipment E either now known or later developed in the future.

The prioritized sensed data received may contain data or a subset of data related to the health or operability of the respective piece of equipment collected and evaluated by the smart communication device, including some combination of vibration data along one or more X, Y or Z axes, temperature data, alarm status data, trend data, historical data, time-based data, FFT evaluated data, etc.; and the scope of the invention is not intended to be limited to the type or kind of prioritized sensed data that is collected and/or evaluated in relation to the health or operability of the respective piece of equipment by the smart communication device.

The processor 10*a* may be configured to provide the corresponding signaling in order to run the app on the smart communication device, e.g., which may include generating screens of the smart communication device, information displayed on the screens, updating information in one or more databases stored in the memory of the smart communication device, generating reports created and provided by the app from the smart communication device, such as route reports related to equipment in one or more of the programmed routes, etc. In addition, the processor 10a may also be configured to provide the corresponding signaling in the form of associated signaling that is provided to each data collector on a respective piece of equipment to adapt or modify the priority of the sensed data being sensed by or transmitted from each data collector.

Figure 3A:
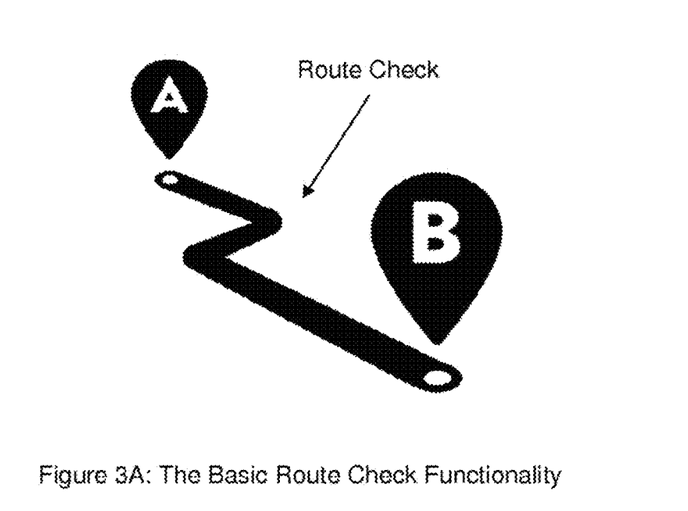
FIG. 3A shows a basic walk-around concept for a mobile application (aka "an app") going from point A to point B via a route check procedure for collecting and evaluating information about equipment distributed over a large area, according to some embodiment of the present invention.

FIG. 3A shows the basic walk-around concept, e.g., for a mobile application (aka "app") configured in such a smart communication device 10 moving along the programmed route from point A to point B via a route check procedure for collecting and evaluating information about equipment distributed over a large area along the programmed route, according to some embodiment of the present invention.

The term "predefined proximity" is understood to mean when the smart communication device is moved within a distance so as to enable it to automatically connect with a particular data collector to receive the signaling during the walk around on the programmed route, e.g., using a wireless technology, e.g., like Bluetooth, for exchanging data over short distances (e.g., using short-wavelength UHF radio waves in the ISM band from 2.4 to 2.485 GHz) from fixed and mobile devices. The scope of the invention is not intended to be limited to any particular type or kind of short distance wireless technology either now known or later developed in the future.

Figure 3B:
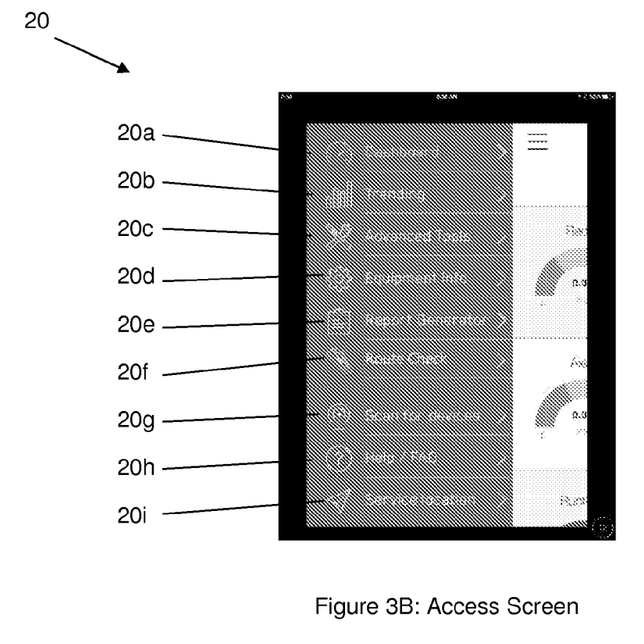
FIG. 3B shows an access screen for the app, according to some embodiment of the present invention.

The processor 10a may also be configured to implement one or more of the features set forth below:

FIG. 3B: Access Screen 20

FIG. 3B shows an access screen 20 for an app, according to some embodiment of the present invention. The processor 10a may be configured to provide suitable signaling in order to display the access screen 20, e.g., when running the app on the smart communication device 10, consistent with that as follows:

The access screen 20 may include some combination of various icons for implementing "access" functionality, e.g., including a dashboard icon 20a, a trending icon 20b, an advanced tools icon 20c, an equipment info icon 20d, a report generator icon 20e, a route check icon 20f, a scan for devices icon 20g, a help/FAQs icon 20h and a service location icon 20i.

By way of example, and consistent with that set forth herein, the "Route Check" functionality may take the form of a so-called walk-around function that includes, or may take the form of, component of an existing app or a standalone app.

The functionality of other icons shown on the access screen 20 is set forth below.

Figure 3C:
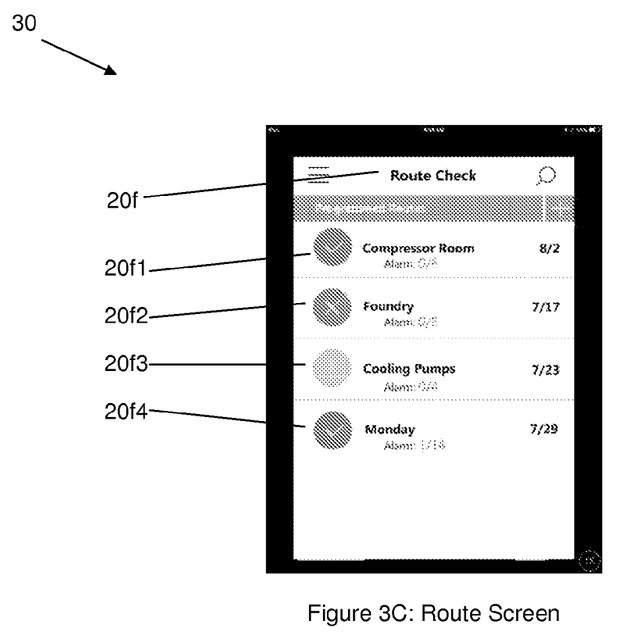
FIG. 3C shows a route screen for the app, according to some embodiment of the present invention.

FIG. 3C: Route Screen 30

FIG. 3C shows a route screen 30 for the route check icon 20f (FIG. 3C) in the app, according to some embodiment of the present invention. The processor 10a may be configured to provide suitable signaling in order to display the access screen 30, e.g., when running the app on the smart communication device 10, consistent with that as follows:

The route screen 30 may include some combination of various icons for implementing "routing" or "route checking" functionality for one or more programmed routes, e.g., including a compressor room icon 20/1, a foundry icon 20/2, a cooling pump icon 20/3, and a Monday icon 20/4. By way of example, the programmed routes may be based upon the rooms, the type of equipment, the day of a week or month, etc.

By way of further example, the route screen 30 may be configured to list all of the programmed routes 20/1, 20/2, 20/3, 20/4 available to the smart communication device 10, provide a summary of information about the programmed routes, and provide programmed route editing functionality.

In particular, and by way of example, the summary of information about the programmed routes may include, e.g., providing the user a completion %; alarm information sensed or gathered during the programmed route; the ability to add or program a new route; the ability to search the programmed routes, such as for a specific programmed route or a specific type of machine or piece of equipment.

The route editing functionality may include allowing the user to import and store an existing route and settings from an email, a server, or another device as a programmed route, create a new programmed route on the device, and/or edit an existing programmed route, etc.

Figure 3D:
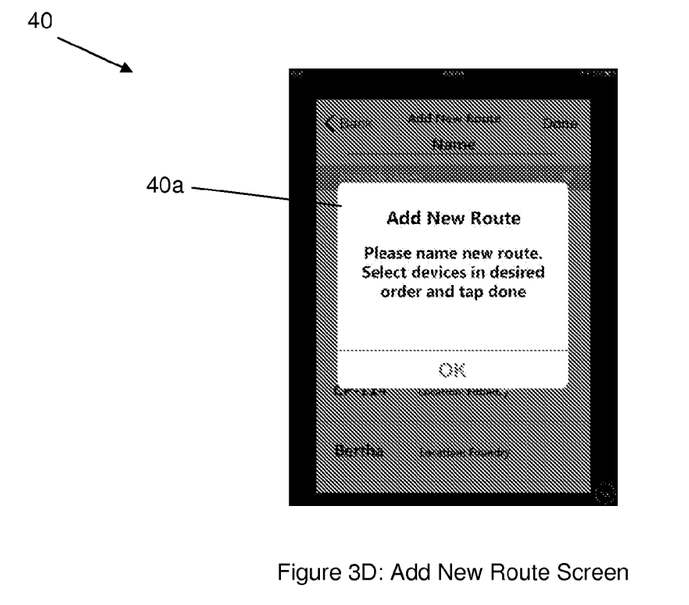
FIG. 3D shows an add new route screen for the app, according to some embodiment of the present invention.

FIG. 3D: Add New Route Screen 40

FIG. 3D shows an add new route screen 40 that may form part of the route screen 30 (FIG. 3C), or that may form part of a separate icon on the access screen 20 (FIG. 3B) in the app, according to some embodiment of the present invention. The processor 10a may be configured to provide suitable signaling in order to display the add new route screen 40, e.g., when running the app on the smart communication device 10, consistent with that as follows:

The add new route screen 40 may include a prompt 40a for adding a new route by tapping on "OK", e.g., including where the adding new route functionality will request the user to provide the name of the new route, and to select devices in a desired order and tap done.

In particular, and by way of example, the user may be prompted to add a name of the route, add machines/equipment to the new route, order the machines/equipment within the new route, provide the ability to label (tag) the location of a device/machine/equipment, and provide a confirmation that a new route has been created, which will add the new route to "Route Screen" 30 (FIG. 3C).

By way of example, the "add machines to route" functionality may be based upon devices/equipment in current proximity, devices/equipment in a past history of routes and/or devices/equipment as emailed or other communications to the smart communication device 10.

By way of example, the "order machines within the route" functionality may provide the user the ability to identify missed machines/equipment.

By way of example, the "ability to label (tag) the location of a device" functionality may be set by the user to provide the app the ability to give instructions for a person to find a machine/equipment on the route.

Figure 3E:
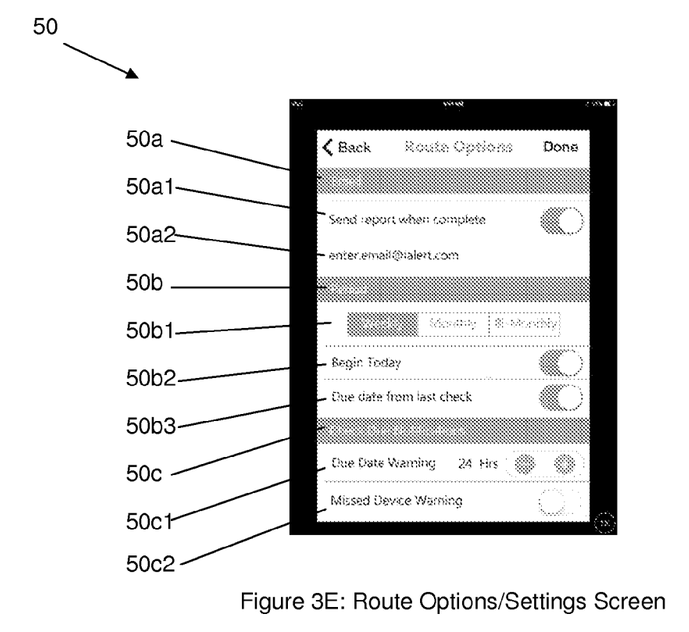
FIG. 3E shows a route option/setting screen for the app, according to some embodiment of the present invention.

FIG. 3E: Route Options/Settings Screen 50

FIG. 3E shows a route options/settings screen 50 that may form part of the route screen 30 (FIG. 3C), or that may form part of a separate icon on the access screen 20 (FIG. 3B) in the app, according to some embodiment of the present invention. The processor 10a may also be configured to provide suitable signaling in order to display the route options/settings screen 50, e.g., when running the app on the smart communication device 10, consistent with that as follows:

By way of example, the route options/settings screen 50 may include email functionality indicated by a function bar 50a, period functionality indicated by a function bar 50b and/or check due notifications indicated by a function bar 50c.

By way of example, the email functionality 50a may include an ON/OFF icon/prompt 50a1 to send a report when complete and an enter email address icon/prompt 50a2 to provide an email to which the report will be sent. For example, when the ON/OFF icon/prompt 50a1 is turned ON, then a report can be sent when completed. In contrast, when the ON/OFF icon/prompt 50a1 is turned OFF, then a report will not be sent.

By way of example, the period functionality 50b may include icons for tapping to make a selection for a "weekly", "monthly" or "bi-monthly" period 50b1; an ON/OFF icon/prompt 50b2 to "begin today"; and an ON/OFF icon/prompt 50b3 re providing a "due date from last check".

By way of example, the "check due notifications" functionality 50c may include +/− icons re providing a "due date warning" in relation to a 24 hour period; and an ON/OFF icon re providing a "missing device warning" For example, tapping the "−" icon will reduce the "due date warning" in relation to the 24 hour period, and tapping the "+" icon will increase the "due date warning" in relation to the 24 hour period.

In particular, and by way of further example, the route options/settings screen 50 provides the user with the ability to set what information is to be collected by the app; set how information will be displayed to a user performing the route; set an email or storage destination where information is to be sent; set the period between checks or calendar dates (when the route is to be performed); set a time that if passed, an alert will be sent to perform the route; set a "Missed Device Warning" alert to prompt the user if a connection was missed; set the level of user interactivity with the data; and/or set the type of data to be collected.

By way of example, the "set email or storage destination where information is to be sent" functionality may include allowing the user to set the email address and storage destination where the data and reports will be sent.

By way of example, the "set the period between checks or calendar dates (when the route is to be performed)" functionality may include allowing the user to set a calendar date for route from a current time, or a scheduled time; and set a period to run—weekly, monthly, bi-monthly, etc.

By way of example, the "time is passed" functionality may include allowing the user to set the alerts as texts, or emails, or app messages, etc.

By way of example, the "'Missed Device Warning' to prompt the user if a connection was missed" functionality may include prompting the user, e.g., if information was received out of order from route order, or if information was not received in time period from starting route.

By way of example, the "set the level of user interactivity with the data" functionality may include the providing the user the ability to set to see data as collected, or data only of alarm equipment, or only the completion of collecting target relevant data.

By way of example, the "set the type of data to be collected" functionality may include providing the user the ability to set the type of data to be collected, e.g., including the following Broadcast data—Data that the collection device emits in an advertising packet and is able to be collected without a paired radio connection;

Connection data, e.g., such as the Data type, Raw data, or Analyzed data (multiple possible), like FFT, RMS (Root Mean Square), Kurtosis, as well as many more types of connection data either now known or later developed in the future that can be used and added in the other embodiments with more sensors; and/or Time-based data, e.g., such as Historical like D/L historical data tailored to a desired analysis level, or immediate data by executing a command for data acquisition and analysis upon proximity.

Figure 3F:
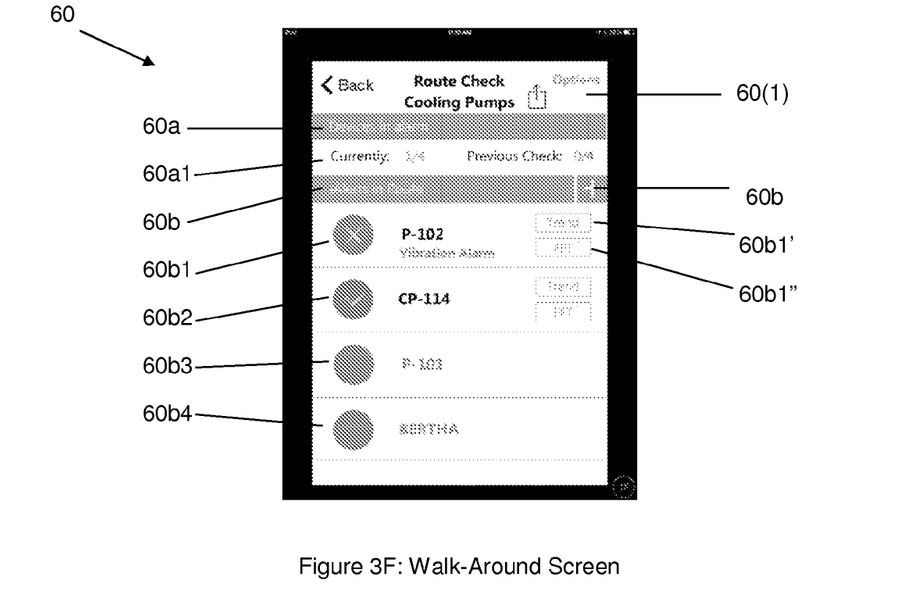
FIG. 3F shows a route screen for the app, according to some embodiment of the present invention.

FIG. 3F: Walk-Around Screen 60

FIG. 3F shows a walk-around screen generally indicated as 60, e.g., for the app for checking specific routes, e.g., like the cooling pump route 20f3 (FIG. 3C) identified on the route screen 30 (FIG. 3C), according to some embodiment of the present invention. The processor 10a may be configured to provide suitable signaling in order to display the walk-around screen 60, e.g., when running the app on the smart communication device 10, consistent with that as follows:

For example, if the user taps the route check icon 20f (FIG. 3B), and taps the cooling pumps icon 20f3 (FIG. 3C), then the walk-around screen 60 will display, and take the form of, a route check screen 60(1) providing functionality for checking a specific route for the cooling pumps listed, e.g., cooling pump P-102, CP-114, P-101 and BERTHA. By way of further example, alternatively if the user taps the route check icon 20f (FIG. 3B), and taps the foundry icon 20f2 (FIG. 3C), then the walk-around screen 60 will display, and take the form of, a route check foundry screen (not shown) providing functionality for checking the specific route for the foundry. Similarly, the walk-around screen 60 would show or display associated functionality in relation to either the compressor room if the user tapped the compressor room icon 20f1, or if the user tapped the Monday icon 20f4.

The route check screen 60(1) may include a device in alarm function bar 60a and an Alert devices in route function bar 60b identifying associated functionality related to the same. The Alert devices in route function bar 60b includes a "+" icon that if tapped allows the user to add an Alert device associated with a piece of equipment on the route. Consistent with that set forth below, a so-called "Alert device" is understood herein to include an alarm device that is configured to monitor equipment, e.g., including industrial, commercial or residential equipment, such as pumps, compressors, etc.

By way of example, the device in alarm function bar 60a may include indications 60a1 containing information about a ratio related to the number of cooling pumps currently in alarm, e.g. 1/4 of the cooling pumps, as shown in FIG. 3F, and also containing information about a ratio related to the number of cooling pumps previously in alarm, e.g. 0/4 of the cooling pumps, as shown in FIG. 3F. In effect, the route being checked includes four (4) cooling pumps, one of the four (4) cooling pumps is currently in an alarm, and none of the four (4) cooling pumps was previously in an alarm.

By way of example, the Alert devices in route function bar 60b may include a "P-102" vibration alarm icon 60b1 related to a designated "P-102" Alert vibration alarm device associated with a piece of equipment on the route, a "CP-114" alarm device icon 60b2 related to a designated "CP-114" Alert device associated with a piece of equipment on the route, a "P-101" alarm device icon 60b3 related to a designated "P-104" Alert device associated with a piece of equipment on the route, and a "BERTHA" alarm device icon 60b4 related to a designated "BERTHA" Alert device associated with a piece of equipment on the route. The aforementioned Alert designations are provided by way of visual example, and are associated with different types or kinds of alarm devices that may be used; However, the scope of the invention is not intended to be limited to any particular type or kind of alarm device that is either now known or later developed in the future.

In addition, the "P-102" vibration alarm icon 60b1 may include a trend indication 60b1' and an FFT indication 60b1". In operation, if the user taps on the "P-102" vibration alarm icon 60b1, then the app will provide information about the trend of the "P-102" vibration alarm, and also information about the FFT related to the "P-102" vibration alarm. The user can use this information to assess the health of the equipment that the "P-102" vibration alarm is monitoring. Similarly, the "CP-114" vibration alarm icon 60b2 may include similar trend and FFT indications (unlabeled), but shown.

In effect, the walk-around screen 60 is intended as the primary view when performing the route (aka walking around). The walk-around screen 60 includes a route tag name at the top thereof, which is clearly identified as the "Route Check Cooling Pumps" associated with the cooling pumps icon 20f3 (FIG. 3C). The walk-around screen 60 is configured to provide the Route Settings, e.g., so that the user may implement a surface scan and have the ability to connect and analyze without automatic connection. Alternatively, the screen 70 may provide the user with a percent compete of an automatic connection to let the user know the automatic connection is being tried. The walk-around screen 60 may be configured to display summary route information compared with previous route, e.g., including information about either current devices in alarm vs. previous, or average temperature now vs. previous.

By way of further example, the app may be configured so that, after the smart communication device is picked up, hotkeys are displayed to download the trends or get new FFT appear for quick access, or automatically download data. A report button can send route data or summary report via email or server upload, e.g., including where the route data or summary report can be completed after or during a route. A new device can be added at any time. Route order can be edited in the walk-around screen 70. The status of route data may be displayed, e.g., where the color red may be used to indicate that a route is not complete. The status of data available to view may be displayed, e.g., including where a greyed trend may be used to indicate that a connection is required. The walk-around screen 70 may be configured so that, when data is downloaded, it can be viewed by tapping key with its name.

Figure 3G:
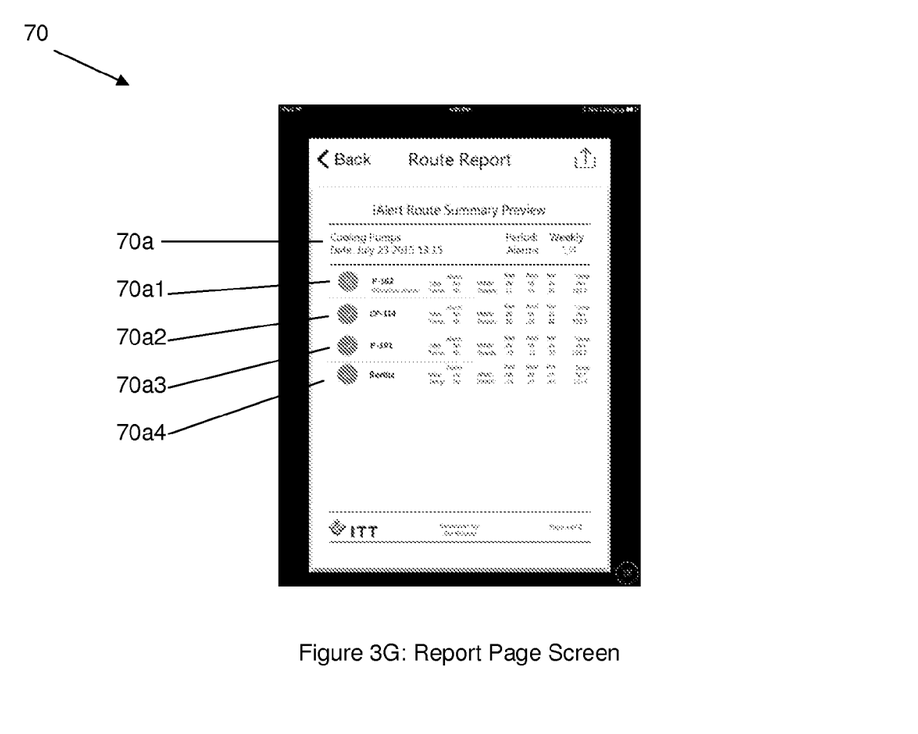
FIG. 3G shows a report page screen for the app, according to some embodiment of the present invention.

FIG. 3G: Report Page Screen 70

FIG. 3G shows a report page screen 70 for the app, according to some embodiment of the present invention. The processor 10a may also be configured to display the report page screen 70, e.g., when running the app on the smart communication device 10, consistent with that as follows:

By way of example, the report page screen 70 may include a function bar containing information about a route summary preview, including the cooling pumps, the date/time (e.g., 23 Jul. 2015, at 13:15), a period alarm indication of weekly alarms (see the icon 50b1 (FIG. 3E) for setting the period) with a "1/4" alarm indication/reading.

By way of example, the report page screen 70 may include a route report icon 70a1 for the "P-102" vibration alarm; a route report icon 70a2 for the "CP-114" alarm device icon 60b2; a route report icon 70a3 for the "P-101" alarm device and a route report icon 70a4 for the "BERTHA" alarm device, e.g., each having respective indications that provide information contained in the report, e.g., including vibration or temperature alarm status Y/N; VRMS readings and threshold settings in relation to radial, axial, horizontal and temperature parameters. The route report icon may be colored in whole or in part, e.g., red to indicate an alarm condition, or green to indicate no alarm condition (other color schemes may also be used).

In operation, based upon the settings and connected devices, the user can generate a report. The user can email or upload the report and data. The report can show any type of data display as set and collected by the user, e.g., if no Trend/FFT were collected, this would be the entirety of the a walk around report. The report can show any type of sensor (vibration (vib), temperature (temp)) or metadata collected off the device (Alarms, timestamp, GPS at collection, etc.).

The Processor 10a

The processor 10a performs the basic signal processing functionality of the apparatus for implementing the present invention. The processor 10a may be a stand alone signal processing module, form part of a controller, controller module, etc., or form part of some other module of the apparatus 10. Many different types and kind of processors are known in the art. By way of example, based on an understanding of such known signal processing modules, a person skilled in the art would be able to configure the processor 10a to perform the functionality consistent with that described herein, e.g., including to receive the signaling containing information about sensed data from a multiplicity of data collectors each associated with a respective piece of equipment on a programmed route and configured to collect the sensed data related to the respective piece of equipment when the apparatus is moved within the predefined proximity to automatically connect with each data collector to receive the signaling during movement of the smart communication device on the programmed route; and to determine corresponding signaling containing information about sensed data related to each of the multiplicity of data collectors for operating an app in the processor, based upon the signaling received.

By way of still further example, the functionality of the processor 10a may be implemented, e.g., as a signal processor or as a signal processing module using hardware, software, firmware, or a combination thereof, although the scope of the invention is not intended to be limited to any particular embodiment thereof. In a typical software implementation, such a module would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology known or later developed in the future.

The processor, controller or controller module may include other modules, components or circuitry 10b to perform other functionality that is known in the art, that does not form part of the underlying invention, and that is not described in detail herein, e.g., including input/output modules, one or more memory modules, data, address and control busing architecture, etc.

The Implementation of the Icons and Screens

The implementation of the icons and screens set forth herein is by way of example. Embodiments are envisioned, and the scope of the invention is intended to include, using other types and kinds of icons and other associate icon functionality either now known or later developed in the future. Furthermore, embodiments are also envisioned, and the scope of the invention is intended to include, using other types and kinds of screen and other associated screen functionality either now known or later developed in the future. Furthermore, embodiments are also envisioned, and the scope of the invention is intended to include, using other types and kinds of interfaces and other associated interface functionality either now known or later developed in the future. In effect, the scope of the invention is not intended to be limited to the implementation of the specific icons and screens set forth herein.

Analytic Techniques

The analytic techniques set forth herein are by way of example, including RMS, FFT, status, etc. Moreover, embodiments are envisioned, and the scope of the invention is intended to include, using other types and kinds of analytic techniques and other associated analytic functionality either now known or later developed in the future. In effect, the scope of the invention is not intended to be limited to the specific analytic techniques set forth herein.

Alert Device

As stated above, an "Alert device" may take the form of an alarm device configured to monitor equipment, e.g., including industrial, commercial or residential equipment, such as pumps, compressors, etc.

The assignee of the present invention manufactures a family of such alarm device, e.g., known as an iAlert™ device. By way of example, the family of such alarm device is intended to include that disclosed in the following:

patent application Ser. No. 14/685,134, filed 13 Apr. 2015, entitled "Sensing module for monitoring conditions of a pump or pump assembly,"

patent application Ser. No. 29/516,282, filed 30 Jan. 2015, entitled "Mounting bracket and a combination of a mounting bracket and a sensing module,"

patent application Ser. No. 29/516,277, filed 30 Jan. 2015, entitled "Sensing module,"

patent application Ser. No. 14/681,577, filed 8 Apr. 2015, entitled "Nodal dynamic data acquisition and dissemination device,"

patent application Ser. No. 12/240,287, filed 29 Sep. 2008, entitled "Compact self-contained condition monitoring device," which issued as U.S. Pat. No. 8,154,417 on 10 Apr. 2012; as well as patent application Ser. No. 29/292,324, filed 5 Oct. 2007, entitled "Compact self-contained condition monitoring device," which issued as U.S. Pat. No. Des. 586,670 on 17 Feb. 2009.

All of the aforementioned patents and patent applications are incorporated by reference in their entirety.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

We claim:

1. A method to monitor industrial equipment, the method comprising:
   moving along a programmed route by a robotic walk around device, wherein the programmed route includes the industrial equipment to be monitored;
   receiving, by a processor, a first signal, wherein the first signal includes first data sensed from a first data collector associated with a first piece of industrial equipment along the programed route;
   receiving, by the processor, a second signal, wherein the second signal includes second data sensed from a second data collector associated with a second piece of industrial equipment along the programed route; and
   determining, by the processor, a monitored signal containing information about the first data and the second data.

2. The method of claim 1, further comprising sending, by the processor, the monitored signal to an email.

3. The method of claim 1, further comprising sending, by the processor, the monitored signal to a storage location.

4. The method of claim 1, further comprising displaying, by the processor, the monitored signal on a user interface of a device.

5. The method of claim 1, further comprising;
   determining, by the processor, alarm data included in the first data and the second data; and
   determining, by the processor, an alarm signal containing the alarm data.

6. The method of claim 5, further comprising displaying, by the processor, at least one of the programed route, the first data, the second data, the monitored signal, and the alarm data on a user interface of a device.

7. The method of claim 1, further comprising implementing, by the processor, a wireless communication protocol, while moving along the programmed route, wherein the wireless protocol configures the processor to automatically pair with the first data collector and the second data collector to receive the first signal and second signal respectively.

8. The method of claim 1, further comprising determining from the first signal, by the processor, if the first piece of equipment is running.

9. The method of claim 8, further comprising determining, by the processor, analytics for the first piece of equipment based on the first signal.

10. A system to monitor industrial equipment, the system comprising:
    a monitoring device, the monitoring device comprising:
      a robotic walk around device;
      a memory, wherein the memory includes a programmed route and the programmed route includes a first piece of industrial equipment and a second piece of industrial equipment to be monitored; and
      a processor in communication with the memory;
    a first data collector associated with the first piece of industrial equipment; and
    a second data collector associated with the second piece of industrial equipment;

wherein the processor is configured to:
  move along the programmed route by the robotic walk around device;
  receive a first signal, wherein the first signal includes first data sensed from the first data collector;
  receive a second signal, wherein the second signal includes second data sensed from the second data collector; and
  determine a monitored signal containing information about the first data and the second data.

11. The system of claim 10, wherein the processor is further configured to send the monitored signal to an email.

12. The system of claim 10, wherein the processor is further configured to send the monitored signal to a storage location.

13. The system of claim 10, wherein the processor is further configured to display the monitored signal on a user interface of a device.

14. The system of claim 10, wherein the processor is further configured to:
  determine alarm data included in the first data and the second data; and
  determine an alarm signal containing the alarm data.

15. The system of claim 14, wherein the processor is further configured to display at least one of the programed route, the first data, the second data, the monitored signal, and the alarm data on a user interface of a device.

16. The system of claim 10, wherein the processor is further configured to implement a wireless communication protocol, while moving along the programmed route, wherein the wireless protocol configures the processor to automatically pair with the first data collector and the second data collector to receive the first signal and second signal respectively.

17. A device to monitor industrial equipment, the device comprising:
  a memory, wherein the memory includes a programmed route and the programmed route includes the industrial equipment to be monitored; and
  a processor in communication with the memory, wherein the processor is configured to:
    move along the programmed route by a robotic walk around device, wherein the programmed route includes the industrial equipment to be monitored;
    receive a first signal, wherein the first signal includes first data sensed from a first data collector associated with a first piece of equipment along the programed route;
    receive a second signal, wherein the second signal includes second data sensed from a second data collector associated with a second piece of equipment along the programed route; and
    determine a monitored signal containing information about the first data and the second data.

18. The device of claim 17, wherein the processor is further configured to send the monitored signal to an email.

19. The device of claim 17, wherein the processor is further configured to send the monitored signal to a storage location.

20. The device of claim 17, wherein the processor is further configured to display the monitored signal on a user interface of a device.

* * * * *